(12) United States Patent
Deyo et al.

(10) Patent No.: US 12,145,723 B2
(45) Date of Patent: Nov. 19, 2024

(54) SECURING ASSEMBLY FOR A ROTOR BLADE

(71) Applicant: Lockheed Martin Corporation, Bethesda, MD (US)

(72) Inventors: Kenneth F. Deyo, Thomaston, CT (US); Andrew Paul Scott, Bethany, CT (US); Frank M. Caputo, Cheshire, CT (US); William P. Fallon, Jr., Wallingford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/087,544

(22) Filed: Dec. 22, 2022

(65) Prior Publication Data

US 2023/0312088 A1    Oct. 5, 2023

Related U.S. Application Data

(62) Division of application No. 16/425,460, filed on May 29, 2019, now Pat. No. 11,572,162.

(51) Int. Cl.
| | |
|---|---|
| *B29C 70/02* | (2006.01) |
| *B29C 70/68* | (2006.01) |
| *B29D 99/00* | (2010.01) |
| *B64C 27/473* | (2006.01) |
| *B29L 31/08* | (2006.01) |

(52) U.S. Cl.
CPC .......... *B64C 27/473* (2013.01); *B29C 70/023* (2013.01); *B29C 70/025* (2013.01); *B29C 70/682* (2013.01); *B29C 70/685* (2013.01); *B29D 99/0025* (2013.01); *B29L 2031/082* (2013.01); *B64C 2027/4736* (2013.01)

(58) Field of Classification Search
CPC ..... B29D 99/0025; B64C 27/48; B64C 11/16; B29C 70/023
See application file for complete search history.

(56) References Cited

U.S. PATENT DOCUMENTS

| | | | |
|---|---|---|---|
| 3,950,115 A * | 4/1976 | Euler | ..................... B29C 70/347 428/116 |
| 4,639,284 A * | 1/1987 | Mouille | .................. B64C 27/82 264/258 |

(Continued)

OTHER PUBLICATIONS

Final Office Action on U.S. Appl. No. 16/425,460 dated May 3, 2022 (9 pages).

(Continued)

*Primary Examiner* — Andrew D Graham
(74) *Attorney, Agent, or Firm* — Foley & Lardner LLP

(57) ABSTRACT

An apparatus for securing first and second skins to a core in a composite rotor blade includes an elongated member configured to be installed through a passage in the core of the composite rotor blade. The elongated member has a first end configured to be attached to an outer surface of the first skin and a second end configured to be attached to an outer surface of the second skin. The apparatus also includes a first patch configured to adhere the first end to the outer surface of the first skin, and a second patch configured to adhere the second end to the outer surface of the second skin such the elongated member extends from the outer surfaces of the first and second skins through the passage in the core.

14 Claims, 6 Drawing Sheets

(56) References Cited

U.S. PATENT DOCUMENTS

| | | | | |
|---|---|---|---|---|
| 5,041,182 | A * | 8/1991 | Sekiguchi | B29D 99/0025 |
| | | | | 264/258 |
| 5,430,937 | A * | 7/1995 | Leahy | B29C 70/78 |
| | | | | 29/889.6 |
| 5,462,408 | A * | 10/1995 | Coffy | B29B 15/08 |
| | | | | 264/261 |
| 7,105,071 | B2 * | 9/2006 | Johnson | B32B 5/18 |
| | | | | 156/92 |
| 8,540,909 | B2 * | 9/2013 | Dan-Jumbo | B29C 73/10 |
| | | | | 264/258 |
| 8,926,880 | B2 | 1/2015 | Kolax et al. | |
| 9,289,927 | B2 * | 3/2016 | Weber | B29C 70/086 |
| 2010/0303628 | A1 * | 12/2010 | Kuntze-Fechner | B64C 27/48 |
| | | | | 416/204 R |
| 2011/0293421 | A1 * | 12/2011 | Denner | F03D 1/0675 |
| | | | | 416/92 |
| 2013/0224022 | A1 * | 8/2013 | Cabrera | B64C 27/48 |
| | | | | 416/134 A |
| 2014/0271215 | A1 * | 9/2014 | Measom | B29C 70/46 |
| | | | | 29/889.71 |
| 2014/0301859 | A1 * | 10/2014 | Hancock | F03D 1/0675 |
| | | | | 156/60 |
| 2015/0040396 | A1 * | 2/2015 | Fremont | B29D 99/0025 |
| | | | | 29/889.71 |
| 2016/0167763 | A1 | 6/2016 | Brakes | |
| 2018/0319101 | A1 * | 11/2018 | Lanfant | B29D 99/0025 |
| 2019/0077502 | A1 * | 3/2019 | Owens | F16C 27/00 |
| 2020/0298969 | A1 * | 9/2020 | Holemans | B64C 27/33 |

OTHER PUBLICATIONS

Non-Final Office Action on U.S. Appl. No. 16/425,460 dated Oct. 14, 2021 (9 pages).

Notice of Allowance on U.S. Appl. No. 16/425,460 dated Sep. 23, 2022 (10 pages).

\* cited by examiner

100

```
┌─────────────────────────────────────────────────────────────────────┐
│ DRILL A HOLE IN A FIRST SKIN OF A BLADE REGION, APPLY ADHESIVE AROUND│──101
│ THE HOLE TO COINCIDE WITH A FRIST PATCH OF A SECURING ASSEMBLY, THE FIRST│
│      PATCH ADHERED TO A FIRST END OF AN ELONGATED MEMBER            │
└─────────────────────────────────────────────────────────────────────┘
                                  │
                                  ▼
┌─────────────────────────────────────────────────────────────────────┐
│ INSERT THE ELONGATED MEMBER THROUGH A PASSAGE IN A CORE OF THE BLADE│──102
│         REGION, AND ATTACH THE FIRST PATCH TO THE FIRST SKIN         │
└─────────────────────────────────────────────────────────────────────┘
                                  │
                                  ▼
┌─────────────────────────────────────────────────────────────────────┐
│ OPTIONALLY TRIM THE ELONGATED MEMBER, AND IN ONE EMBODIMENT, INJECT │──103
│              FILLER MATERIAL INTO THE PASSAGE                        │
└─────────────────────────────────────────────────────────────────────┘
                                  │
                                  ▼
┌─────────────────────────────────────────────────────────────────────┐
│ ATTACH A SECOND END OF THE ELONGATED MEMBER TO A SECOND SKIN OF THE BLADE│──104
│ REGION, IN ONE EMBODIMENT ATTACH A SECOND PATCH TO THE SECOND END AND AN │
│              OUTER SURFACE OF THE SECOND SKIN                        │
└─────────────────────────────────────────────────────────────────────┘
```

FIG. 5

SECURING ASSEMBLY FOR A ROTOR BLADE

CROSS-REFERENCE TO RELATED APPLICATIONS

This application is a divisional of U.S. patent application Ser. No. 16/425,460, filed on May 29, 2019, the content of which is incorporated herein by reference in its entirety.

BACKGROUND

Exemplary embodiments relate to the art of composite aircraft blades, and more particularly, to components installable on composite blades for preventing or reducing blade peel.

Many modern helicopters and some fixed wing aircraft include rotor blades (e.g., helicopter rotor blades) made from composite materials. A typical blade includes sections having composite outer skins. For example, some rotor blades include a pocket region or assembly that has a lightweight core such as a honeycomb core and composite outer skins, such as carbon fiber skins.

BRIEF DESCRIPTION

According to one or more embodiments, an apparatus for securing first and second skins to a core in a composite rotor blade includes an elongated member configured to be installed through a passage in the core of the composite rotor blade. The elongated member has a first end configured to be attached to an outer surface of the first skin and a second end configured to be attached to an outer surface of the second skin. The apparatus also includes a first patch configured to adhere the first end to the outer surface of the first skin, and a second patch configured to adhere the second end to the outer surface of the second skin such the elongated member extends from the outer surfaces of the first and second skins through the passage in the core.

In addition to one or more of the features described above or below, or as an alternative, the elongated member includes a bundle of fibers.

In addition to one or more of the features described above or below, or as an alternative, the bundle of fibers is configured as a roving having a plurality of roving strips.

In addition to one or more of the features described above or below, or as an alternative, the apparatus further includes a first adhesive which adheres the first patch to the first end of the elongated member and the outer surface of the first skin to secure the elongated member to the first skin.

In addition to one or more of the features described above or below, or as an alternative, the apparatus further includes a second adhesive which adheres the second patch to the second end of the elongated member and the outer surface of the second skin to secure the elongated member to the second skin.

In addition to one or more of the features described above or below, or as an alternative, the apparatus further includes a filler material configured to be injected into the passage to adhere a length of the elongated member to a surface of the passage.

In addition to one or more of the features described above or below, or as an alternative, the apparatus further includes an elongated tubular support sleeve configured to house a length of the elongated member, the tubular support sleeve configured to be inserted into the passage with the elongated member.

In addition to one or more of the features described above or below, or as an alternative, the first end is configured to be attached to the outer surface of the first skin by an adhesive, and the second end is configured to be attached to the outer surface of the second skin by an adhesive.

According to one or more embodiments, a composite rotor blade includes a pocket assembly, the pocket assembly including a core separating a first skin and a second skin. The apparatus mechanically connects the first skin and the second skin to the core.

In addition to one or more of the features described above or below, or as an alternative, the core includes at least one of a honeycomb core and a foam core.

According to one or more embodiments, a method of securing a skin to a composite rotor blade includes installing an elongated member of a securing assembly in a passage of the composite rotor blade. The composite rotor blade includes a core, a first skin adhered to a first side of the core and a second skin adhered to a second side of the core. The method also includes attaching a first end of the elongated member to an outer surface of the first skin, and attaching a second end of the elongated member to an outer surface of the second skin.

In addition to one or more of the features described above or below, or as an alternative, the elongated member includes a bundle of fibers, and the installing includes inserting the bundle of fibers through the passage, attaching the first end to the first skin, and attaching the second end to the second skin.

In addition to one or more of the features described above or below, or as an alternative, the bundle of fibers is configured as a roving having a plurality of roving strips, and the installing includes inserting the plurality of roving strips through the passage, splaying outwardly first ends of the plurality of roving strips and attaching the first ends of the plurality of roving strips to the first skin, and splaying outwardly second ends of the plurality of roving strips and attaching the second ends of the plurality of roving strips to the second skin.

In addition to one or more of the features described above or below, or as an alternative, the securing assembly includes a first patch attached to the first end of the elongated member, and the method further includes attaching the first patch to the outer surface of the first skin to secure the elongated member to the first skin.

In addition to one or more of the features described above or below, or as an alternative, the securing assembly includes a second patch, and the method further includes attaching the second patch to the second end of the elongated member and to the outer surface of the second skin to secure the elongated member to the first skin.

In addition to one or more of the features described above or below, or as an alternative, the installing includes injecting a filler material into the passage to adhere a length of the elongated member to a surface of the passage.

In addition to one or more of the features described above or below, or as an alternative, the securing assembly includes an elongated tubular support sleeve configured to house a length of the elongated member, and the installing includes inserting the tubular support sleeve into the passage with the elongated member.

In addition to one or more of the features described above or below, or as an alternative, the securing assembly is configured to be installed in a pocket assembly of the composite rotor blade.

In addition to one or more of the features described above or below, or as an alternative, the first end is attached to the outer surface of the first skin by an adhesive, and the second end is attached to the outer surface of the second skin by an adhesive.

In addition to one or more of the features described above or below, or as an alternative, the core includes a honeycomb core and/or a foam core.

BRIEF DESCRIPTION OF THE DRAWINGS

The following descriptions should not be considered limiting in any way. With reference to the accompanying drawings, like elements are numbered alike:

FIG. 5 is a flow chart illustrating aspects of an embodiment of a method of installing a securing assembly in a rotor blade assembly;

DETAILED DESCRIPTION

A detailed description of one or more embodiments of the disclosed apparatus and method are presented herein by way of exemplification and not limitation with reference to the Figures.

Apparatuses and methods for securing components of a composite rotor blade and/or installing a securing assembly in a composite rotor blade are provided herein. An embodiment of a securing assembly includes an elongated member, such as a fiber bundle or roving, which is configured to be inserted through a core of a rotor blade region. In one embodiment, the rotor blade region includes a core and a skin adhered to each side of the core, i.e., a first skin and a second skin. A first end of the elongated member is configured to be adhered or otherwise attached to the first skin, and a second end of the elongated member is configured to be adhered or otherwise attached to the second skin. The securing assembly thus provides a mechanical connection between the first skin and the second skin to secure the first and second skins to the core.

Embodiments described herein present a number of advantages and technical effects. For example, the securing assembly provides an economical and effective way to improve performance of a blade by providing an improved attachment between skins and core sections of the blade. The securing assembly reduces or prevents skin to core disbonds and also reduces the spread of any skin to core disbonding that may occur. In addition, the securing assembly can be used to repair disbonds in blades. Embodiments thus reduce pocket failures and provide an effective way to repair disbonds, which increases the useful life of blades and reduces the need to scrap or rebuild blades.

Figure 1:
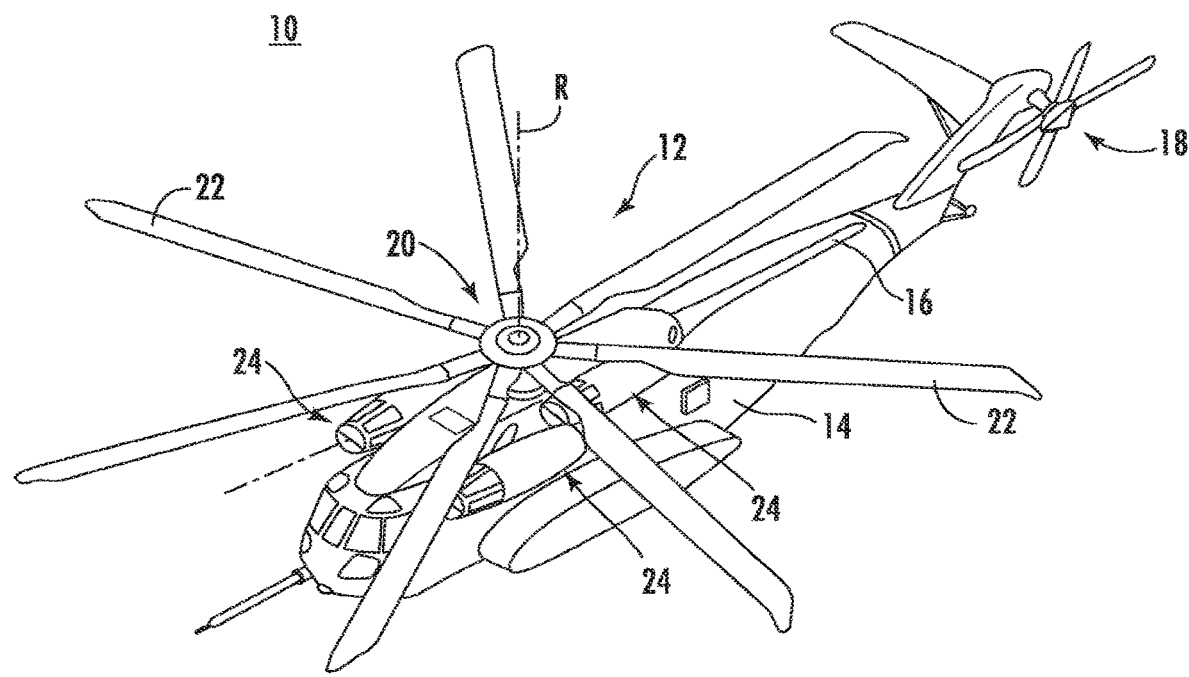
FIG. 1 depicts a rotary wing aircraft in accordance with an exemplary embodiment.

FIG. 1 schematically illustrates an example of a rotary wing aircraft 10 having a main rotor assembly 12. The aircraft 10 includes an airframe 14 having an extending tail 16 which mounts a tail rotor system 18. The main rotor assembly 12 includes a plurality of rotor blade assemblies 22 mounted to a rotor hub assembly 20. The main rotor assembly 12 is driven about an axis of rotation R through a main gearbox by one or more engines 24. Although a particular helicopter configuration is illustrated and described in this example, embodiments described herein are not so limited, and can be utilized in conjunction with any aircraft or vehicle that utilizes rotor blades. Examples of such aircraft include high speed compound rotary wing aircrafts with supplemental translational thrust systems, dual contra-rotating, coaxial rotor system aircrafts, tilt-rotors and tilt-wing aircrafts, vertical takeoff and lift rotary wing aircrafts, and fixed wing aircrafts.

Figure 2:
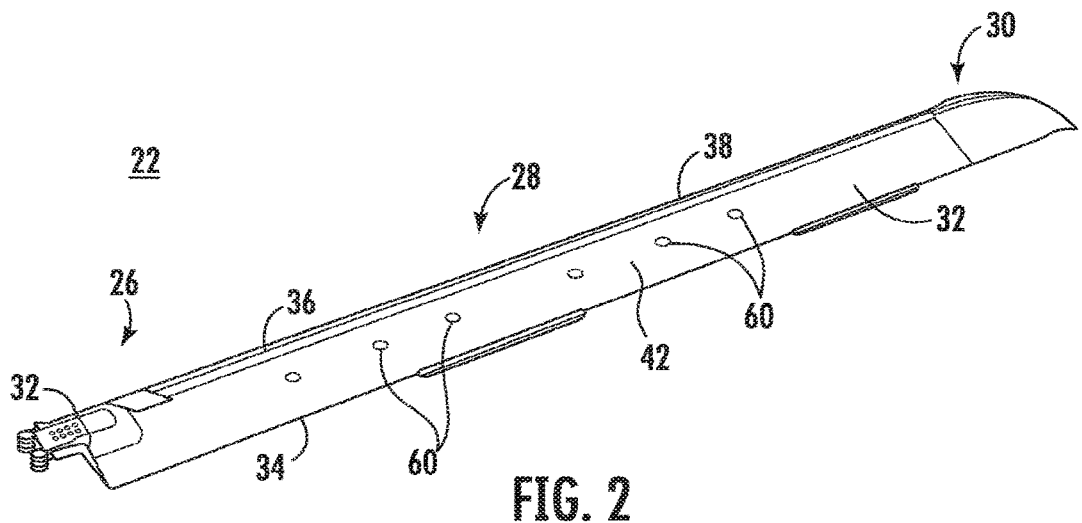
FIG. 2 depicts an embodiment of a rotor blade assembly.

Referring to FIG. 2, each rotor blade assembly 22 generally includes a root section 26, an intermediate section 28 and a tip section 30. A blade cuff 31 is typically mounted at an inboard end of the root section 26. Each rotor blade section 26, 28 and 30 may define particular airfoil geometries to tailor the rotor blade aerodynamics to the velocity increase along the rotor blade span. The rotor blade assembly 22 may be made from composite materials. As described herein, a composite component or composite material is a component or material made from two or more constituent materials. Examples of composite materials include fiberglass, fiber reinforced polymers, composite wood materials, resin systems and others. It is noted that composite materials, core materials and materials that can make up a securing assembly are not limited to those described herein.

Each rotor blade assembly 22 includes one or more pocket assemblies 32 that taper to a trailing edge 34 of the blade assembly 22. For example, the root section 26 and/or the intermediate section 28 includes a pocket assembly 32 attached to a spar assembly 36 that defines a leading edge 38.

Figure 3:
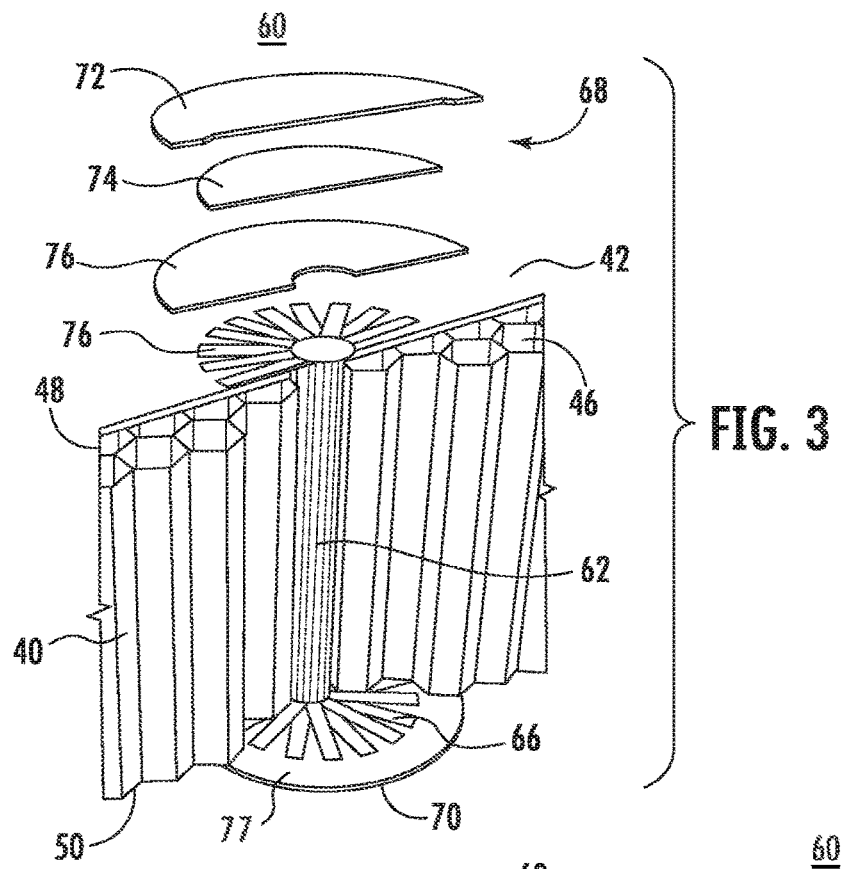
FIG. 3 is an exploded perspective view of an embodiment of a securing assembly installed in a rotor blade assembly.
Figure 4:
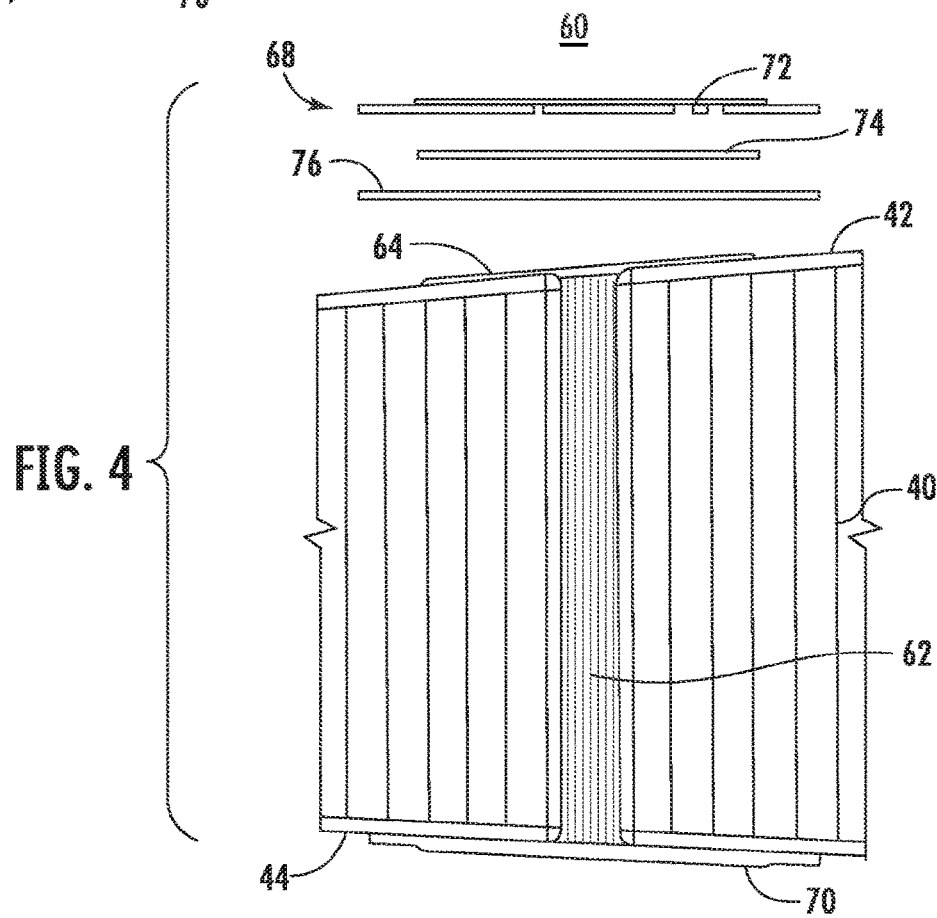
FIG. 4 is an exploded cross-sectional view of the securing assembly of FIG. 3.

Referring to FIG. 3, an embodiment of a pocket assembly 32 includes a core 40, and a first skin and a second skin on opposing sides of the core 40. In this embodiment, the first skin is one of an upper skin 42 and a lower skin 44, and the second skin is another of the upper skin 42 and the lower skin 44. In other words, the first skin is the upper skin 42 and the second skin is the lower skin 44, or the first skin is the lower skin 44 and the second skin is the upper skin 42. The upper and lower skins 42 and 44, in one embodiment, are made from a composite material that includes, for example, fiberglass, carbon fiber and/or Kevlar.

The core 40, in one embodiment, includes one or more passages 46 that extend from a first side 48 of the core 40 to a second side 50 of the core 40. For example, the core 40 is made from a lightweight material (e.g., aluminum, plastic and/or composite material) that is arranged in a honeycomb pattern. As shown in FIG. 3, the honeycomb pattern forms a plurality of passages 46 that extend between the first side 48 and the second side 50. It is noted that the configuration and materials of the core 40 are not limited to the specific materials and configurations discussed herein. For example, the core 40 is not limited to a honeycomb configuration and can have any configuration that includes passages that extend therethrough. In one embodiment, if the core 40 is solid or otherwise does not already have passages 46 formed therein like in a honeycomb pattern (e.g., the core is made from foam or balsa wood), a passage 46 can be formed by creating a passage. For example, a hole can be drilled through the core 40 to create one or more passages 46.

During operation of an aircraft, there is a risk that portions of an upper and/or lower skin 42/44 can separate from the core 40. Such separation is referred to herein as disbonding, which can occur at any point during the operating life of a blade; however, the risk of disbonding increases as the blade ages. Blades with low peel over a pocket region or pocket assembly are particularly susceptible to disbonding.

Typically, blades are periodically manually inspected to detect areas of disbonding. Currently, blades that exhibit significant disbonding are scrapped or require stripping and rebuilding of the skin. The need to perform such inspections and potentially to rebuild or replace blades is costly both in time and expense.

One or more securing assemblies may be installed in a selected region of a blade assembly to reduce the risk of disbonding and address the challenges described above. Referring again to FIGS. 2 and 3, the blade assembly 22 includes one or more securing assemblies 60, each of which includes an elongated member 62 that is configured to be inserted through a passage 46 in a core 40 of a selected region of the blade assembly 22. Each securing assembly 60, when installed, is adhered to or otherwise attached to a first skin 42/44 adhered to one side of the core 40 and/or to a second skin 44/42 adhered to a second side of the core 40. In one embodiment, the elongated member 62 is configured to be attached to both skins 42 and 44. The securing assembly 60 provides a mechanical connection between a skin 42/44 and the core 40 and/or a mechanical connection between the skins 42/44, which acts to reduce or minimize occurrences of disbonding, limits disbond growth and reduces peel mode propagation.

A securing assembly 60 can be installed at any number of locations on the blade assembly 22. For example, as shown in FIG. 2, a plurality of securing assemblies 60 can be installed along the pocket assembly 32 of the blade assembly 22. In this example, the securing assemblies 60 are installed through a midsection of the pocket assembly 32 and are spaced at least substantially evenly along a length of the blade assembly 22. The number and position of the securing assembly or assemblies 60 is not limited to the description herein.

FIG. 3 illustrates an embodiment of the securing assembly 60. The securing assembly 60 in this embodiment includes an elongated member 62 configured as a bundle of fibers, also referred to as a fiber bundle. The fiber bundle may be made from any suitable material. For example, the fiber bundle can be made from fiberglass and/or carbon fiber roving (e.g., glass fiber gun roving). The elongated member 62 is not limited to fiber bundles, and can be configured in any suitable manner. For example, the elongated member 62 can be formed as an integrated or solid member (e.g., a rod) made from plastic, lightweight metal and/or composite material, which can have various degrees of stiffness.

When installed, the fiber bundle is inserted through a passage 46 and secured or attached to the upper skin 42 and/or the lower skin 44. The fiber bundle has a first end 64 that is configured to be adhered or otherwise attached to an exterior of the upper skin 42, e.g., on an outer surface of the upper skin 42. Likewise, the fiber bundle has a second end 66 that is configured to be adhered or otherwise attached to an exterior of the lower skin 44, e.g., on an outer surface of the lower skin 44.

In the embodiment of FIG. 3, the first end 64 extends through a hole in the upper skin 42 and the ends of the fibers (or roving strips) in the fiber bundle are splayed outwardly and can be adhered to an outer surface of the upper skin 42. The second end 66 likewise extends through a hole in the lower skin 44, and the ends of the fibers at the second end 66 are splayed and adhered to an outer surface of the lower skin 44. In this way, the fiber bundle (or other elongated member 62) provides a mechanical connection between the upper and lower skins.

To facilitate insertion or installation of the elongated member 62, the elongated member 62 may include a tubular support sleeve (not shown) to provide some rigidity and allow the elongated member 62 (e.g., the fiber bundle and/or roving strips) to be easily inserted. An example of a support sleeve is discussed further below.

In one embodiment, the securing assembly includes a first patch 68 and/or a second patch 70 to facilitate attachment of respective ends 64, 66 of the elongated member 62 (e.g., the fiber bundle) to the first skin 42/44 and/or the second skin 44/42. The first patch 68 and/or the second patch 70 may be made from multiple components or a single component. For example, the first patch 68 includes an outer patch component 72 and an inner patch component 74. The outer patch component 72 is attached to or adhered to the inner patch component 74 and covers the inner patch component 74 (so that the inner patch component 74 is sandwiched between the outer patch component 72 and the upper skin 42). The second patch 70 may have similar components configured to be similarly attached to the lower skin 44. In the embodiment of FIG. 3, the first patch and the second patch are attached to their respective skin surfaces via an adhesive 77.

Although the patches in the embodiment of FIG. 3 are shown as being circular, they are not so limited. Each patch may have any suitable shape and size, including rectangular, hexagonal, triangular, or oval shapes.

FIG. 5 is a flow chart that illustrates an embodiment of a method 100 of installing a securing assembly and/or manufacturing components of a rotor blade assembly. The method 100 includes one or more stages 101-104. In one embodiment, the method 100 includes the execution of all of the stages 101-104 in the order described. However, certain stages may be omitted, stages may be added, or the order of the stages changed.

The method 100 is discussed in conjunction with the blade assembly 22 of FIG. 2 and the securing assembly 60. The method 100 is also discussed in conjunction with an embodiment of the securing assembly 60 shown in FIGS. 6-10, which illustrate some aspects of the method 100.

Figure 6:
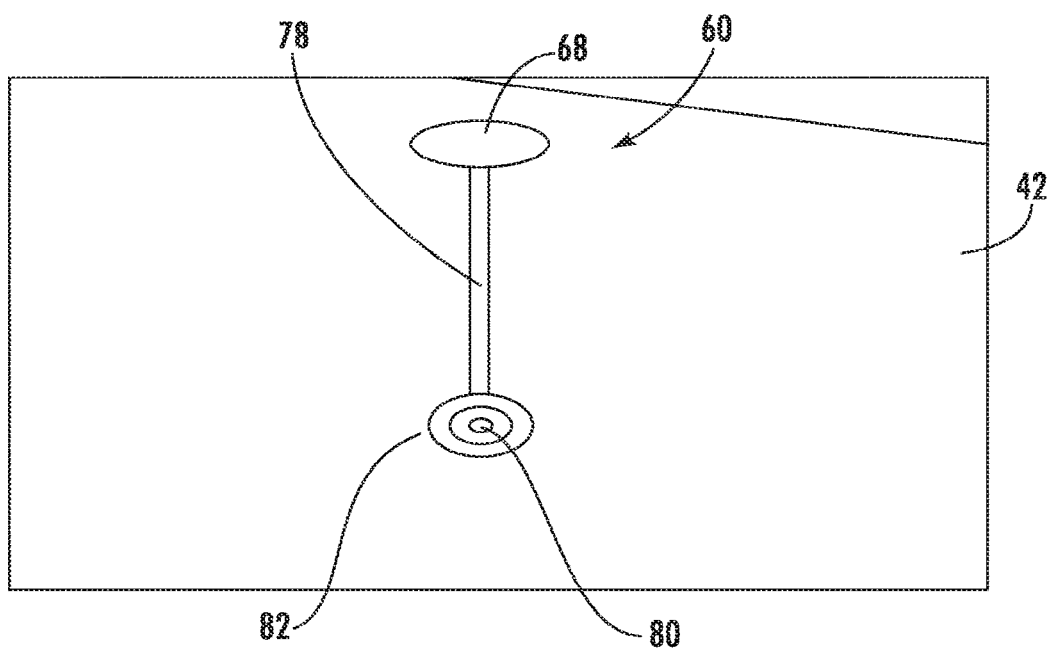
FIG. 6 depicts an embodiment of a securing assembly and shows an aspect of the method of FIG. 5.

In one embodiment, as shown in FIG. 6, the securing assembly 60 is pre-assembled for use in installing the securing assembly 60 on or in the blade assembly 22. In this embodiment, the securing assembly 60 includes the elongated member 62 such as a fiber bundle, and also includes the first patch 68, which has been pre-adhered to the first end 64 of the elongated member 62. For example, the elongated member 62 can include uncured roving strips, where lengths of the uncured roving strips are pre-cured to the first patch 68. To facilitate installation, the elongated member 62 in this embodiment includes a tubular support sleeve 78 that is at least as long as the thickness of the core 40 and that houses the fiber bundle 62, protects the securing assembly 60 prior to installation, and allows the fiber bundle 62 to be easily inserted through a passage 46.

In the first stage 101, a hole is drilled through the first and second skins 42/44 of a region of a blade assembly, such as the pocket assembly 32, and an adhesive is applied to the first skin 42. For example, as shown in FIG. 6, a hole 80 is drilled through the upper skin 42 to coincide with an end of a passage 46. A second hole may also be drilled in the lower skin 44 to coincide with an opposing end of the passage 46. In one embodiment, if the core 40 does not already have passages formed therein, the hole can be drilled through the core 40 and the skins 42/44 in order to create the passage 46. Adhesive 82 is applied to an area of an outer surface of the upper skin 42 around the hole 80 and corresponds to an area of the first patch 68.

In one embodiment, the elongated member 62 comprises a fiber bundle which includes a plurality of uncured roving strips. The ends of the roving strips may be pre-adhered to the first patch 68.

Figure 7:
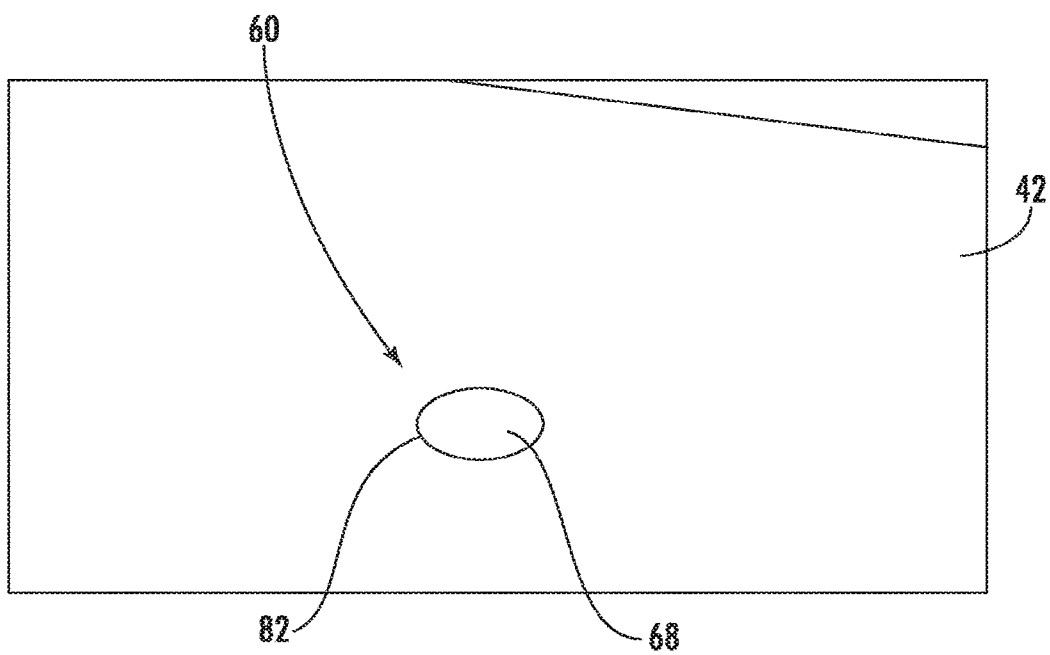
FIG. 7 depicts the securing assembly of FIG. 6, and shows an aspect of the method of FIG. 5.

In the second stage 102, an elongated member 62 of a securing assembly is inserted into and through a passage 46 in a core 40 of the region. A first end 64 of the elongated member is adhered to or otherwise attached to the first skin 42. For example, the support sleeve 78 housing a length of the fiber bundle is inserted through the passage 46 of the core 40 and the first patch 68 is adhered to an outer surface of the upper skin 42. FIG. 7 shows the securing assembly 60 adhered to the upper skin 42.

Figure 8:
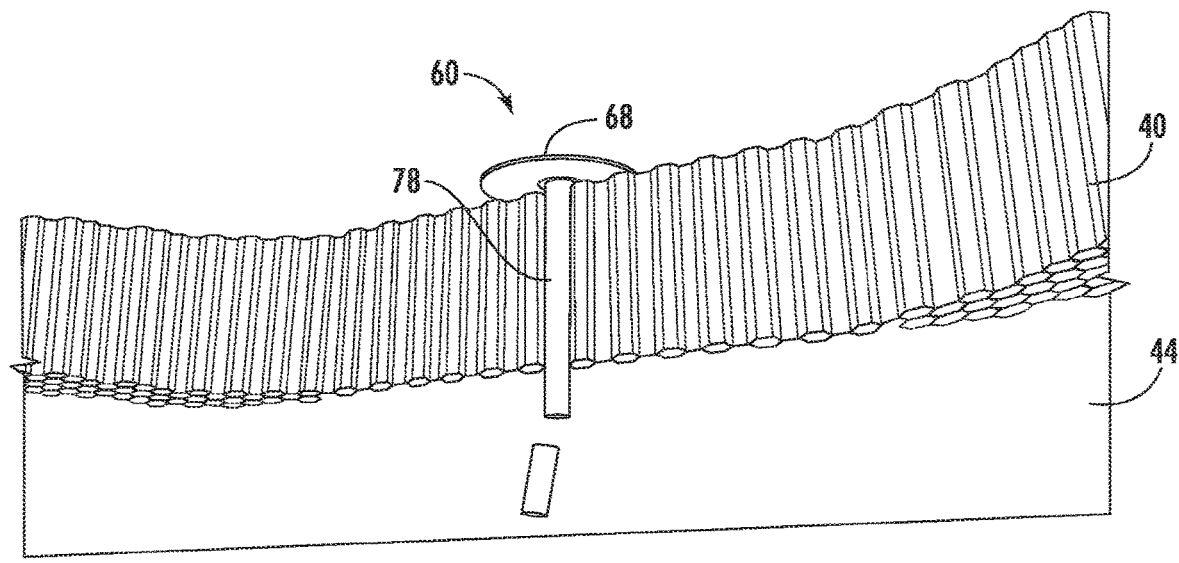
FIG. 8 depicts the securing assembly of FIGS. 6 and 7, and shows an aspect of the method of FIG. 5.
Figure 9:
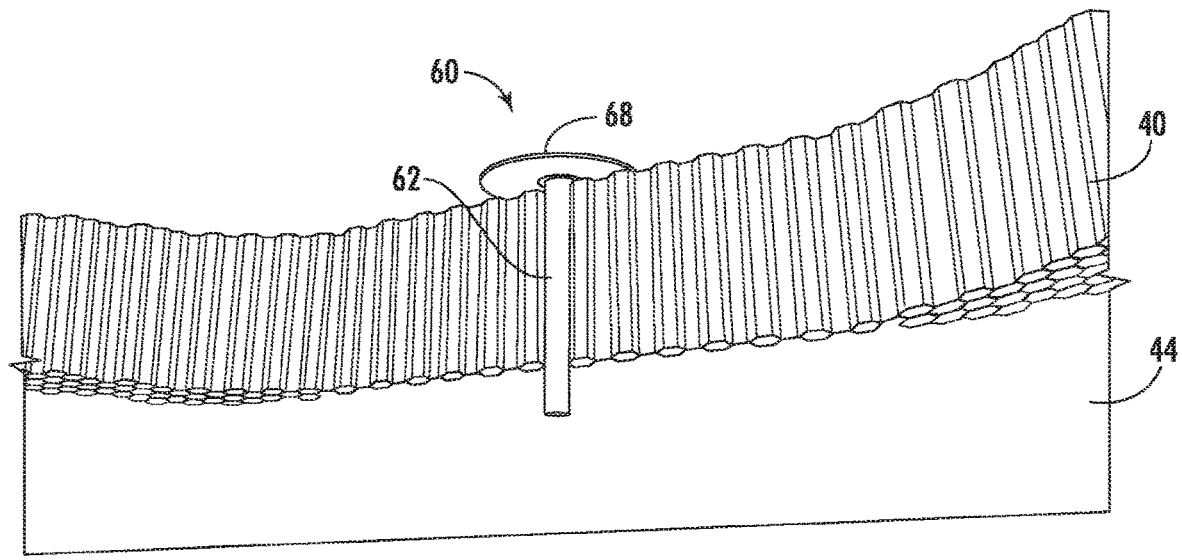
FIG. 9 depicts the securing assembly of FIGS. 6-8, and shows an aspect of the method of FIG. 5.
Figure 10:
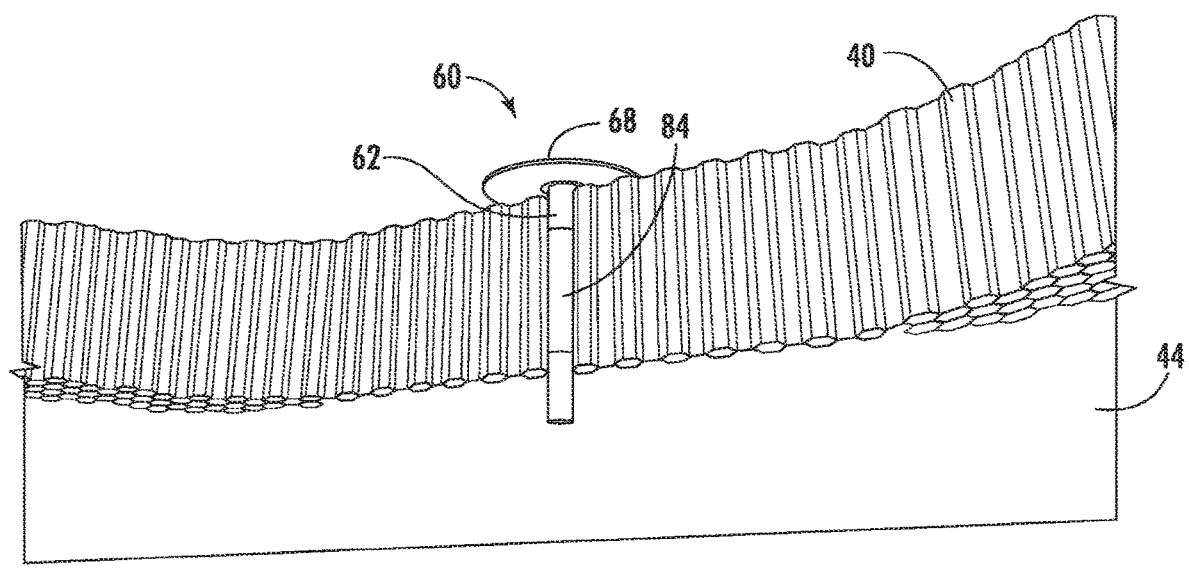
FIG. 10 depicts the securing assembly of FIGS. 6-9, and shows an aspect of the method of FIG. 5.

In the third stage 103, the elongated member 62 may be trimmed as desired and a filler material such as a resin may be injected into the passage around the member. For example, the support sleeve 78 is trimmed as shown in FIG. 8 and then removed from the passage 46 to expose the fiber bundle, as shown in FIG. 9. The support sleeve 78 may be trimmed such that a selected length of the fiber bundle extends from the lower skin 44 to form the second end 66 and can be attached to the outer surface of the lower skin 44.

In the fourth stage 104, a second end 66 of the elongated member 62 is attached to the second skin 44. For example, lengths of the fiber bundle at the second end 66 (e.g., strips of the roving) can be splayed and adhered to the outer surface of the lower skin 44. In one embodiment, a second patch such as the patch 70 can be adhered to the lengths of the fiber bundle and the outer surface of the lower skin 44.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of securing a skin to a composite rotor blade, comprising:
    installing an elongated member of a securing assembly in a passage of the composite rotor blade, the composite rotor blade including a core, a first skin adhered to a first side of the core and a second skin adhered to a second side of the core;
    attaching a first end of the elongated member to an outer surface of the first skin; and
    attaching a second end of the elongated member to an outer surface of the second skin;
    wherein the elongated member comprises a bundle of fibers; and wherein installing the elongated member comprises:
        splaying each fiber of the bundle of fibers radially outward from a central axis of the bundle of fibers; and
        adhering the first skin and the second skin at the respective first and second ends of the elongated member via at least one adhesive, the first and second ends of the elongated member being splayed radially outward during adhesion.

2. The method of claim 1, wherein the installing includes inserting the bundle of fibers through the passage, attaching the first end to the first skin, and attaching the second end to the second skin.

3. The method of claim 1, wherein the bundle of fibers is configured as a roving having a plurality of roving strips, and the installing includes inserting the plurality of roving strips through the passage, splaying outwardly first ends of the plurality of roving strips and attaching the first ends of the plurality of roving strips to the first skin, and splaying outwardly second ends of the plurality of roving strips and attaching the second ends of the plurality of roving strips to the second skin.

4. The method of claim 1, wherein the securing assembly includes a first patch attached to the first end of the elongated member, and the method further includes attaching the first patch to the outer surface of the first skin to secure the elongated member to the first skin.

5. The method of claim 4, wherein the securing assembly includes a second patch, and the method further includes attaching the second patch to the second end of the elongated member and to the outer surface of the second skin to secure the elongated member to the first skin.

6. The method of claim 1, wherein the installing includes injecting a filler material into the passage to adhere a length of the elongated member to a surface of the passage.

7. The method of claim 1, wherein the securing assembly includes an elongated tubular support sleeve configured to house a length of the elongated member, and the installing includes inserting the tubular support sleeve into the passage with the elongated member.

8. The method of claim 1, wherein the securing assembly is configured to be installed in a pocket assembly of the composite rotor blade.

9. The method of claim 1, wherein the core includes at least one of a honeycomb core and a foam core.

10. The method of claim 5, wherein each of the first patch and the second patch comprises an inner patch component, the outer patch component configured to cover the inner patch component.

11. The method of claim 5, wherein the at least one adhesive comprises a first adhesive and a second adhesive, wherein attaching the first patch to the outer surface of the first skin comprises adhering the first patch to the first end of the elongated member and the outer surface of the first skin with a first adhesive, a width of the first adhesive and the first patch being greater than a width of the first end of the elongated member.

12. The method of claim 11, wherein attaching the second patch to the outer surface of the second skin comprises adhering the second patch to the second end of the elongated member and the outer surface of the second skin with the second adhesive.

13. A method of securing a skin to a composite rotor blade, comprising:
- installing an elongated member of a securing assembly in a passage of the composite rotor blade, the composite rotor blade including a core, a first skin adhered to a first side of the core and a second skin adhered to a second side of the core;
- attaching a first end of the elongated member to an outer surface of the first skin; and
- attaching a second end of the elongated member to an outer surface of the second skin;
- wherein the elongated member comprises a bundle of fibers, each fiber of the bundle of fibers being splayed radially outward from a central axis of the bundle of fibers, and wherein installing the elongated member comprises adhering the first skin and the second skin at the respective first and second ends of the elongated member via at least one adhesive, the first and second ends of the elongated member being splayed radially outward;
- wherein the securing assembly includes a first patch attached to the first end of the elongated member, and the method further includes attaching the first patch to the outer surface of the first skin to secure the elongated member to the first skin;
- wherein the securing assembly includes a second patch, and the method further includes attaching the second patch to the second end of the elongated member and to the outer surface of the second skin to secure the elongated member to the first skin; and
- wherein each of the first patch and the second patch comprises an inner patch component, the outer patch component configured to cover the inner patch component.

14. A method of securing a skin to a composite rotor blade, comprising:
- installing an elongated member of a securing assembly in a passage of the composite rotor blade, the composite rotor blade including a core, a first skin adhered to a first side of the core and a second skin adhered to a second side of the core;
- attaching a first end of the elongated member to an outer surface of the first skin; and
- attaching a second end of the elongated member to an outer surface of the second skin;
- wherein the elongated member comprises a bundle of fibers, each fiber of the bundle of fibers being splayed radially outward from a central axis of the bundle of fibers, and wherein installing the elongated member comprises adhering the first skin and the second skin at the respective first and second ends of the elongated member via at least one adhesive, the first and second ends of the elongated member being splayed radially outward;
- wherein the securing assembly includes a first patch attached to the first end of the elongated member, and the method further includes attaching the first patch to the outer surface of the first skin to secure the elongated member to the first skin;
- wherein the securing assembly includes a second patch, and the method further includes attaching the second patch to the second end of the elongated member and to the outer surface of the second skin to secure the elongated member to the first skin; and
- wherein the at least one adhesive comprises a first adhesive and a second adhesive, wherein attaching the first patch to the outer surface of the first skin comprises adhering the first patch to the first end of the elongated member and the outer surface of the first skin with a first adhesive, a width of the first adhesive and the first patch being greater than a width of the first end of the elongated member.

\* \* \* \* \*